United States Patent Office 2,750,701
Patented June 19, 1956

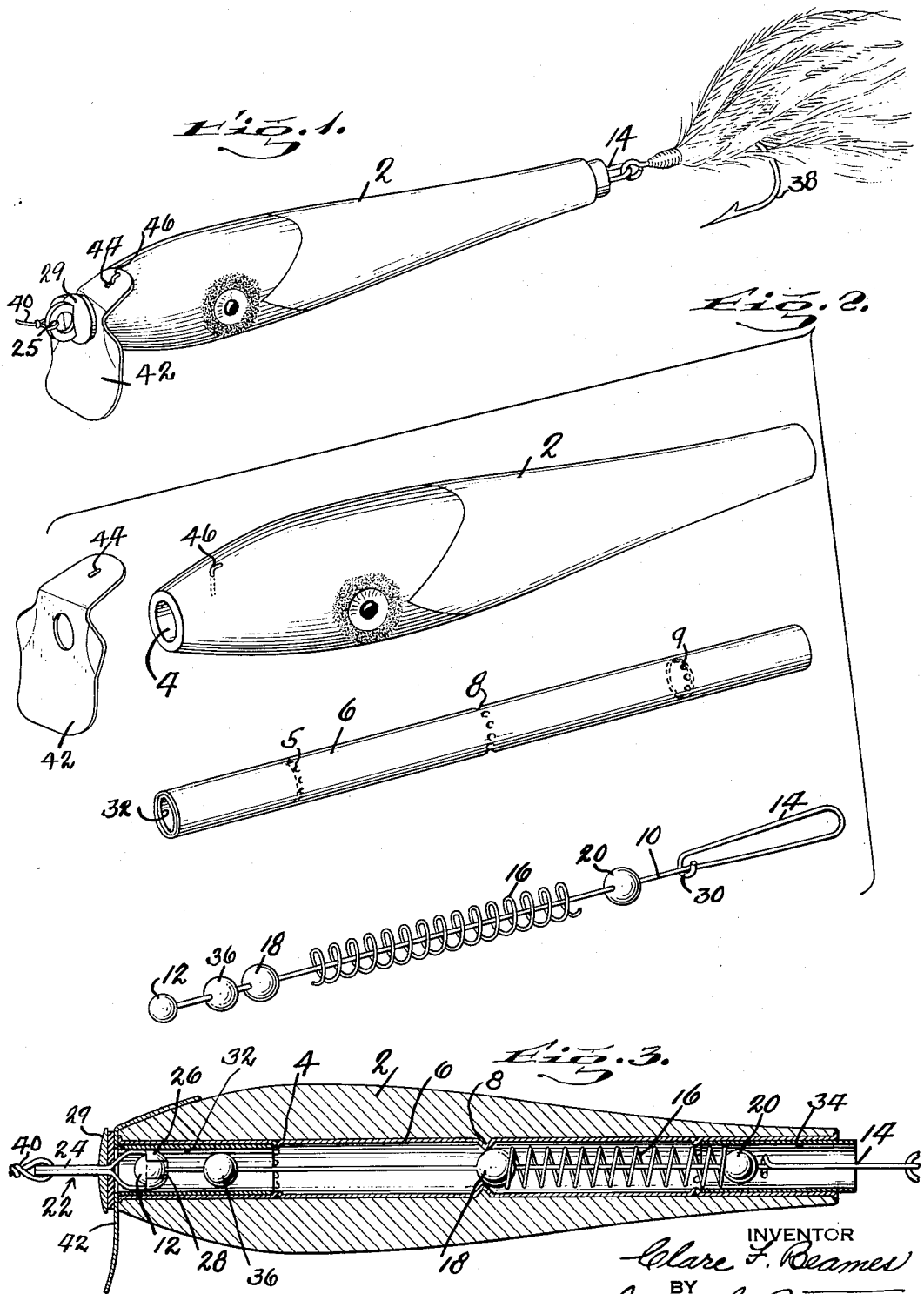

2,750,701

FISHING LURE

Clare F. Beames, West Hartford, Conn.

Application June 11, 1953, Serial No. 361,024

3 Claims. (Cl. 43—42.09)

This invention relates to an improvement in fishing lures and has for one of its objects to provide a lure assembly so constructed and arranged as to permit a quickly substituting one lure body for another and to permit of changing from one size or style of hook to another.

More particularly, the present invention provides a rod which is adapted to be threaded through a lure body, this rod being provided at each end with a fastener element whereby a fishing line may be detachably attached to one end of the rod, and a hook or hooks of various sizes and styles may be selectively detachably attached to the other end of the rod. In addition to the foregoing, the rod is readily and quickly removable from the lure body when another lure body is to be substituted.

My invention is not limited to lure bodies of one shape, nor is this invention confined to lures of the floating variety, my invention being adaptable for use with practically all lures of the so-called plug type.

In the accompanying drawings, wherein I have illustrated an embodiment of my invention, Fig. 1 is a perspective view showing a lure, constructed in accordance with my invention, completely assembled;

Fig. 2 is an exploded view of the lure of Fig. 1 with attaching elements omitted; and Fig. 3 is a longitudinal cross-section of the lure of Fig. 1.

Referring to the drawings in detail, 2 designates a lure body. As will be seen from the drawings, this body has a longitudinal bore 4 extending its entire length. In the construction illustrated, the bore 4 is lined with a metal liner 6, extending the length of the bore and flared at the lure ends as illustrated. This liner is deformed at 5, 8, and 9, to provide wall stops, which will be referred to in more detail hereinafter, but I might say at this point that these stops reduce the bore diameter without, however, entirely closing the bore at the stop areas.

10 designates a metal rod or shaft which is slightly longer than the bore 4 of the lure, this rod extending loosely along the bore 4 and being provided at the head end of the lure with one element 12 of a fastener and at the tail end with a fastener 14. As will be brought out hereinafter, the fastener element 12 is for the ready attachment of a line to the rod 10, while the fastener 14 is provided for detachably attaching a hook or hook assembly to the rear end of the rod.

Loosely coiled about the rod or shaft 10 is a spring 16, and loosely mounted upon the rod at each end of the spring 16 is an element which may be any one of many shapes but here shown as small balls 18 and 20, the ball 18 being smaller in diameter than the clear bore at the stop 9 but larger than the clear bore at the stop 8.

The fastener element which cooperates with the element 12, already referred to, is designated 22 and comprises a stem 24, having an eye 25 in its outer end for the attachment of a fishing line 40, while its inner end is cup-shaped, as shown at 26, the cup being slotted at 28. In addition, the stem 24 of the element may pass through a small disc-like element 29, to which it is secured, or this disc may be integral with 24.

It will be appreciated that, to apply this element 22 to the element 12, it is merely necessary to place the fastener element 22 at an angle to the rod or shaft 10, so that the slot 28 will receive the rod and then to align the element 22 with the rod, at which time the cup 26 will encircle the element 12.

The fastener 14 at the tail end of the rod 10 might be similar to 12, but to avoid the necessity of a special design of hook, I have shown a conventional type of fastener wherein the rod 10 is bent back upon itself and the end crimped slightly, as seen at 30, so as to hook over the main part of the rod.

Lying within the liner 6 at the head end thereof is a sleeve 32, and at the tail end of the liner I provide a sleeve 34. These sleeves are a sliding fit in the liner, and their movement inwardly of the liner is limited by the wall stops 5 and 9, respectively. These sleeves frictionally contact fastener element 22 and fastener 14.

A short distance behind the fastener element 12 at the head end of the lure is a ball 36 affixed to or integral with the rod or shaft 10. This element 36 limits lateral movement of the rod or shaft within the sleeve 32 when the rod is projected so as to carry the fastener element 12 beyond the end of the sleeve. The internal diameters of the sleeves 32 and 34 are slightly larger than the elements 26, 36, 18, 16, 20, and 30.

To assemble the lure, the rod assembly, as illustrated in Fig. 2, with the hook 38 attached, is simply introduced through the sleeve 34, liner 6, and through sleeve 32 from the rear or tail end of the lure until the ball 18 on the rod strikes and is stopped by the stop 8 of liner 6. The forward motion of the rod is continued until its forward end projects sufficiently beyond the head of the lure to permit the fastener element 26 to be hooked over the fastener element 12. Upon cessation of the forward pressure on the rod, the spring 16, which is now under compression, will retract the rod rearwardly again until the member 29 abuts the head end of the lure to hold the parts assembled.

It is apparent also that, if the lure body is forced rearwardly while tension is being imparted to the fish line 40, the sleeve 32 will be drawn to the lure exterior by the element 26 and prevent spreading of the slot 28 and disengagement of the element 26 from fastener element 12.

To change the position of the hook 38 from the tail end of the lure to the opposite end, it is merely necessary to press the lure body rearwardly of the rod 10 until the end of the sleeve 32 and the snap fastener cup element 26 are exposed. The sleeve is then pushed back into the liner and fastener element 22 removed. The lure body may now be withdrawn entirely, reversed in position, and then the rod assembly inserted at the front end of the lure body instead of at the rear end.

If the lure is to be provided with a darting vane, such as 42, slot 44 of this vane is slipped over the offset guide hook 46, with which the lure body may be provided, and the hole in the vane centered opposite head end of sleeve 32. The fastener element 12 is projected beyond the hole in darting vane 42, as above described, and fastener element 26 is engaged with fastener element 12. With the parts thus assembled, the vane 42 will be held firmly against the end of the lure by the tension of spring 16, the vane being clamped between disc 29 and the lure end.

It is to be understood that changes may be made in the details of construction above described within the purview of my invention. As already pointed out, the elements 18 and 20 do not have to be spherical in shape, while, if the material of the lure body is sufficiently strong and tough, it may be unnecessary to employ a liner 6 but merely necessary to provide stops 5, 8, and 9 directly in the wall of the lure bore 4.

It will be seen from all of the foregoing that my invention provides a construction whereby it becomes unnecessary to carry a variety of complete lures, each with its hooks attached and eyed for the attachment of a line. One may carry any number of lure bodies and but one rod assembly. This is a great convenience, as will be appreciated by any angler. Economically, my invention presents an advance over conventional practice inasmuch as in my case it becomes unnecessary to purchase a complete lure each time the angler wishes to provide himself with a new lure.

What I claim is:

1. A fishing lure comprising, in combination, a body member having a longitudinal bore extending its entire length; a liner for said bore, flared at each end against the body member; a rod slightly longer than the lure, loosely extending along said bore; a fastener at each end of said rod; a pair of elements including a forward element and a rear element loosely slidably mounted upon said rod; a stop on the rod for the rearward element of said pair of elements; a spring loosely mounted on the rod intermediate said elements; a stop in the wall of said liner adapted to be engaged by the forward element of said pair of elements when said rod is moved along the liner, to place said spring under compression; a sleeve slidable within the liner at each end of the liner, each sleeve surrounding a fastener to reinforce and prevent spreading of the same; and a stop for each sleeve in the wall of said liner, to limit inward movement of the sleeves relative to the liner.

2. A fishing lure comprising, in combination, a body member having a longitudinal bore; a liner for said bore; a rod loosely extending along said liner; a fastener at each end of said rod; a pair of elements slidably mounted upon the said rod, a stop for the rearward element of said pair of elements, and a spring loosely mounted on the rod intermediate said elements; a second stop forward of the first stop adapted to be engaged by the forward element of said pair when the said rod is moved along the liner, to place the spring under compression; a pair of sleeves, one of said pair at each end of said liner and slidable within the same, each of said sleeves surrounding a fastener to reinforce and prevent spreading of the same; and an additional pair of stops including one for each sleeve, one of said additional pair being forward of said first mentioned stops, and the other of said additional pair being intermediate said first mentioned stops, to limit inward movement of the sleeves relative to the liner.

3. A lure comprising, in combination, a body member, said body member having a longitudinal bore throughout its length; a rod extending loosely along said bore; means at one end of the rod for detachably attaching a line thereto, said means comprising a member having a line-attaching eye at its outer end and a slotted cup at its inner end, one end of the rod being shaped to be received and gripped by said cup; a fastener at the opposite end of the rod for detachably attaching a hook thereto; a stop intermediate the ends of said bore; a pair of elements loosely mounted upon said rod; and a coil spring under compression on the rod intermediate said pair of elements and cooperating with said elements, one element cooperating with said stop and the other with a rear portion of the rod, whereby said one end of said rod is urged by said spring into said bore such that the cupped end of said line-attaching means is held within said bore, thereby to prevent detachment of the cup from the rod.

References Cited in the file of this patent

UNITED STATES PATENTS

| | | |
|---|---|---|
| 575,674 | Woodward | Jan. 19, 1897 |
| 1,318,073 | Gottschalk | Oct. 7, 1919 |
| 1,444,876 | Hanson | Feb. 13, 1923 |
| 1,727,936 | Pflueger | Sept. 10, 1929 |
| 1,842,591 | Dunkelberger | Jan. 26, 1932 |
| 2,065,854 | Edel et al. | Dec. 29, 1936 |
| 2,152,275 | Parkins | Mar. 28, 1939 |
| 2,254,800 | Furdas | Sept. 2, 1941 |
| 2,357,472 | Jenkins | Sept. 5, 1944 |
| 2,387,255 | Godlewski | Oct. 23, 1945 |
| 2,470,861 | Prentice | May 24, 1949 |
| 2,488,475 | Merritt | Nov. 15, 1949 |
| 2,654,177 | Cope et al. | Oct. 6, 1953 |
| 2,706,359 | Beames | Apr. 19, 1955 |

FOREIGN PATENTS

| | | |
|---|---|---|
| 683,430 | Great Britain | May 7, 1951 |